Patented Dec. 24, 1946

2,413,247

UNITED STATES PATENT OFFICE 2,413,247

N-SUBSTITUTED AMINO MONOHYDRIC SECONDARY ALCOHOLS AND PROCESS FOR PREPARING THEM

Murray Senkus, Terre Haute, Ind., assignor to Commercial Solvents Corporation, Terre Haute, Ind., a corporation of Maryland No Drawing. Application August 19, 1944, Serial No. 550,307

4 Claims. (Cl. 260—584)

This invention relates to new N-substituted amino monohydric secondary alcohols and to a method for preparing them.

My invention relates more particularly to compounds having the following formula:

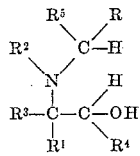

in which R is alkyl, R¹ is selected from a group consisting of hydrogen and alkyl, R² is selected from a group consisting of alkyl, aralkyl and aryl, R³ is selected from a group consisting of hydrogen, alkyl, aralkyl and aryl, R⁴ is selected from a group consisting of alkyl and aryl, and R⁵ is selected from a group consisting of hydrogen, alkyl and aryl.

As examples of compounds included by the above formula there may be mentioned the following: 2-dibutyl-amino - 2 - methyl-3-hexanol; N-benzyl -N-ethyl-2-amino-2-methyl-3-hexanol; N-benzyl - N-(1-phenylethyl) -2-amino-1-phenylpropanol; N-(2 - ethylhexyl)-N-(1 - methyl-2-ethyl-hexyl)-1-amino - 2 - pentanol; N-ethyl-N-phenyl-3-amino-3-phenyl-2 - propanol; N-ethyl-N-(1,2-dimethylpropyl) -2 - amino - 1-phenyl-3-pentanol, and the like.

This application is a continuation-in-part of my copending application Serial No. 442,082, filed May 7, 1942 now matured into U. S. P. 2,363,465, and differs from that patent in that the compounds of the present invention are all secondary alcohols whereas those of the copending application referred to are primary alcohols.

I have discovered that compounds of the above type may be prepared from oxazolidines of the type illustrated below by treating the oxazolidine compounds with Grignard reagents and hydrolyzing the resulting reaction product according to the following scheme:

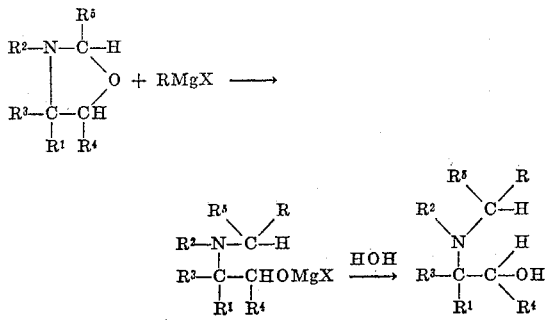

in which the R substituents are as described above and X is a halogen.

The oxazolidines which form the starting materials for preparing the products of my invention differ from those utilized in my copending application by being substituted in the number 5 position (R⁴) by an aryl or alkyl radical. The oxazolidines from which my new secondary alcohols are prepared therefore, are themselves prepared by the reaction of approximately one mole of an appropriate N-monosubstituted amino monohydric alcohol with one mole of an aldehyde such as formaldehyde, acetaldehyde, butyraldehyde, isobutyraldehyde, benzaldehyde, ethylhexaldehyde, propionaldehyde, or the like, for example in an inert liquid such as benzene under refluxing conditions. The benzene may be removed by distillation and the oxazolidine product isolated by distillation under reduced pressure or by filtration, or the like.

In practicing my invention, the Grignard reagent is prepared by adding the appropriate organic halide to magnesium turnings according to the standard procedure in anhydrous, alcohol-free ether. The oxazolidine is then added in the approximate proportion of one mole of oxazolidine to one mole of Grignard reagent, with which it immediately reacts. The Grignard reaction product is then treated with water or ice to hydrolyze and split off the magnesium halide and the amino alcohol product is recovered from the appropriate liquid layer, depending on the solubility of the particular compound, whether soluble or insoluble in water, by suitable means such as by repeated extraction followed by distillation or evaporation of the solvent.

The following examples are given to further illustrate my invention.

EXAMPLE I 2-dibutylamino-2-methyl-3-hexanol

Ten parts of n-propyl chloride (0.13 mole) were mixed with 3.5 g. of magnesium turnings (0.14 mole) in 100 parts of anhydrous ethyl ether. Twenty-four parts of 3-butyl-4,4-dimethyl-5-propyloxazolidine (0.12 mole) dissolved in 250 parts of anhydrous ether were added to the Grignard solution over thirty minutes. Twenty-five parts of water were added dropwise to the mixture over thirty minutes. The mixture was stirred for about five minutes and the ether layer was removed from the vessel by decantation. Two hundred parts of ether were added to the vessel and the mixture was stirred for several minutes. The ether layer was decanted and combined with the first ether layer. The ether composite was distilled in the steam bath to remove the ether. The residue was distilled in vacuo. This distillation gave 22 g. of 2-dibutylamino-2-methyl-3-hexanol, B. P. 86.5–87.0° at 0.20 mm. The material is a colorless odorless liquid which is soluble in methanol, benzene, and petroleum ether, but insoluble in water. Calculated for $C_{15}H_{33}NO$: N, 5.72. Found: N, 5.79

$$d_{20}^{20}\ 0.8634\quad n_D^{20}\ 1.4529$$

Example II

N-benzyl-N-ethyl-2-amino-2-methyl-3-hexanol

To a mixture of 6 parts of magnesium turnings (0.25 mole) and 250 parts of anhydrous ethyl ether were added 31 parts of methyl iodide (0.22 mole). After the methyl iodide had all reacted with the metal, 50 parts of 3-benzyl-4,4-dimethyl-5-propyloxazolidine (0.21 mole) in 250 parts of anhydrous ethyl ether were added to the Grignard solution. Forty parts of water were added dropwise to the mixture in the vessel while the mixture was agitated. Agitation was continued for 15 minutes. The ether layer was removed by decantation. Distillation of the ether layer gave 45 parts of N-benzyl-N-ethyl-2-amino-2-methyl-3-hexanol, B. P. 110–112° at 0.20 mm. The amino alcohol is a colorless odorless liquid which is soluble in methanol, benzene, and petroleum ether but insoluble in water. Calculated for $C_{16}H_{27}NO$: N, 5.62. Found: N, 5.63

$$n_D^{20}\ 1.5082\quad d_{20}^{20}\ 0.9617$$

Example III

N-benzyl-N-(1-phenylethyl)-2-amino-1-phenyl-propanol

Thirty-eight parts of 3-benzyl-2,5-diphenyl-4-methyloxazolidine (0.11 mole) in 250 parts of ether were mixed with methyl magnesium iodide which was prepared from 25 parts of methyl iodide (0.17 mole) in 250 parts of ether. Twenty-five parts of water were added dropwise to the reaction mixture while agitating. The ether layer was removed and distilled. This distillation yielded 30 parts of N-benzyl-N-(1-phenylethyl)-2-amino-1-phenyl-propanol, B. P. 190–193° at 0.20 mm. The amino alcohol is a colorless viscid liquid which is soluble in methanol, benzene and petroleum ether but insoluble in water. Calculated for $C_{24}H_{27}NO$: N, 4.06. Found: N, 4.21. Material very viscous. $n_D^{20}\ 1.5845$, $d_4^{30}\ 1.06$.

While the above illustrates the preferred embodiments of my invention it will be understood that departures may be made therefrom within the scope of the specification and claims.

What is claimed is:

1. In a process for the preparation of N-substituted amino monohydric secondary alcohols of the general formula

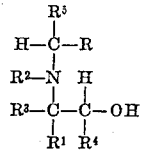

the steps which comprise reacting an oxazolidine compound having the formula

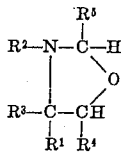

in which $R^1$ is selected from a group consisting of hydrogen and alkyl, $R^2$ is selected from a group consisting of alkyl, aralkyl and aryl, $R^3$ is selected from a group consisting of hydrogen, alkyl, aralkyl and aryl, $R^4$ is selected from a group consisting of alkyl and aryl and $R^5$ is selected from a group consisting of hydrogen, alkyl and aryl; with a Grignard reagent having the formula RMgX, wherein R represents alkyl, and thereafter hydrolyzing the resulting reaction product.

2. In a process for preparing 2-dibutylamino-2-methyl-3-hexanol, the steps which comprise reacting 3-butyl-4,4-dimethyl-5-propyloxazolidine with propyl magnesium chloride and thereafter hydrolysing the reaction product.

3. In a process for preparing N-benzyl-N-ethyl-2-amino-2-methyl-3-hexanol, the steps which comprise reacting methyl magnesium iodide with 3-benzyl-4,4-dimethyl-5-propyloxazolidine, and thereafter hydrolysing the reaction product.

4. In a process for preparing N-benzyl-N-(1-phenylethyl)-2-amino-1-phenylpropanol, the steps which comprise reacting methyl magnesium iodide with 3-benzyl-2,5-diphenyl-4-methyloxazolidine, and thereafter hydrolysing the reaction product.

MURRAY SENKUS.